United States Patent
Soulant, Jr.

[11] 3,883,266
[45] May 13, 1975

[54] DIFFERENTIAL LIFT CONTROL BY SYNCHRONOUS RESONANT EXCITATION OF AIR COLUMN IN HELICOPTER ROTOR

[76] Inventor: Herman A. Soulant, Jr., 501 Gilscot Pl., Rockville, Md. 20851

[22] Filed: Sept. 24, 1973

[21] Appl. No.: 400,107

[52] U.S. Cl. .................... 416/1; 416/20
[51] Int. Cl. ............................ B64c 27/72
[58] Field of Search ............ 416/20, 1, 90, 90 A

[56] References Cited
UNITED STATES PATENTS

| | | | |
|---|---|---|---|
| 1,982,968 | 12/1934 | Stalker | 416/90 A X |
| 2,686,567 | 8/1954 | Costa | 416/20 |
| 3,039,537 | 6/1962 | Heidelberg | 416/90 A X |
| 3,211,397 | 10/1965 | Laing et al. | 416/20 X |
| 3,524,711 | 8/1970 | Cheeseman et al. | 416/20 |
| 3,525,577 | 8/1970 | Cheeseman | 416/20 X |
| 3,588,273 | 6/1971 | Kizilos | 416/20 |
| 3,713,750 | 1/1973 | Williams | 416/20 |

Primary Examiner—Everett A. Powell, Jr.
Attorney, Agent, or Firm—R. S. Sciascia; Q. E. Hodges; O. M. Wildensteiner

[57] ABSTRACT

A circulation control rotor for a helicopter wherein cyclic lift control air is admitted to the rotor in pulses whose frequency is the natural frequency of the air column in the rotor blade. The pulsating flow can be the only air admitted to the rotor, or it can be added to a steady state flow from another source.

1 Claim, 2 Drawing Figures

DIFFERENTIAL LIFT CONTROL BY SYNCHRONOUS RESONANT EXCITATION OF AIR COLUMN IN HELICOPTER ROTOR

The invention described herein may be manufactured and used by or for the Government of the United States of America for Governmental purposes without the payment of any royalties thereon or therefor.

BACKGROUND OF THE INVENTION

This invention relates to circulation control rotor helicopters. Briefly, a circulation control rotor is one wherein the blades are rigidly fixed to the rotor hub and undergo no cyclic flapping motion. Cyclic lift control is achieved by controlling the circulation of air around the rotor blade. This is accomplished by blowing air through slots in the blade surface in the manner shown in U.S. Pat. No. 3,713,750.

The prior art shows many examples of circulation control helicopters wherein the valve which directs air to each blade in the proper sequence is located in the rotor hub. This requires that the rotor hub be comparatively large, thereby giving rise to excessive drag during flight. In addition, the hub is mechanically complex due to the moving parts required within the hub for the valve.

SUMMARY OF THE INVENTION

The present invention is a circulation control rotor having no moving parts in either the blade or the hub. A tube projects into one blade and pulses of air are fed into the blade through this tube. The frequency of the pulses is made to coincide with the rotational frequency of the rotor blade; the rotor is made to rotate at the resonant frequency of the air column within the rotor so that each pulse of air reinforces the preceeding pulse. The valving necessary to supply the pulses of air is located in the body of the helicopter, thereby allowing the minimum sized rotor blade and hub. A steady flow of air can be supplied to the blade along with the pulsating air flow, or pulsating air flow alone can be supplied to the blade.

OBJECTS OF THE INVENTION

Accordingly, it is an object of the present invention to provide a circulation control rotor having no moving parts in the blades or the hub.

It is a further object to provide a circulation control rotor which utilizes the natural frequency of the air column in the rotor blades to obtain cyclic lift control.

It is a further object to provide a circulation control rotor which has minimum cross sectional area and drag.

Other objects and advantages of the present invention will be apparent from the following specification and accompanying drawings.

DESCRIPTION OF THE PREFERRED EMBODIMENT

Figure 1:
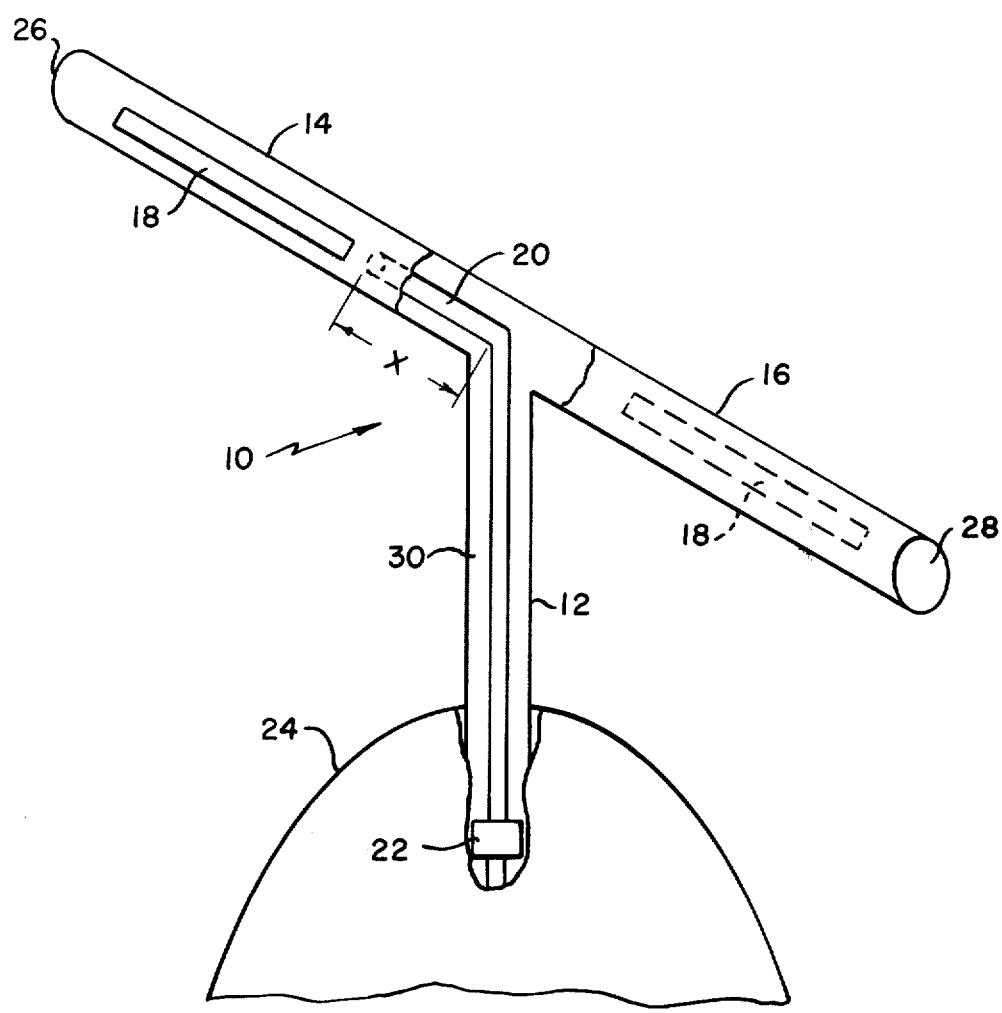
FIG. 1 shows a circulation control rotor according to the present invention having one pulse tube per pair of blades.

FIG. 1 shows a circulation control helicopter rotor 10 according to the present invention. Rotor 10 is comprised of shaft 12 and blades 14 and 16. Blades 14 and 16 have slots 18 on their surface; these slots and their function are shown more fully in U.S. Pat. No. 3,713,750. Blade 14 has a pulse tube 20, projecting a distance $x$ into it. Tube 20 is supplied with pulses of air or other lift control fluid by means of pulse generator 22 which is located within helicopter body 24. Pulse generator 22 can be a solenoid operated valve in a high pressure air supply line or any other well-known means of generating pulses of air. The primary requirement is that it be able to supply pulses of the proper duration and frequency, as will be explained later.

Operation of the above configuration follows. Rotor 10 is caused to rotate by means (not shown) attached to shaft 12. When rotor 10 has been brought up to its operational speed, pulse generator 22 is activated. Pulse generator 22 is physically connected to shaft 12 in such a manner that pulses of air or other lift control fluid are generated at a constant azimuthal position of blade 14. In this manner, cyclic lift always occurs at the same point in the cycle of rotor 10.

As each pulse of air exits from tube 20 it causes a pressure pulse to travel the length of blade 14, strike end wall 26 of blade 14, and then return down blade 14. The pressure pulse then proceeds into blade 16, travels the length of the blade, strikes end wall 28, and then returns toward blade 14. As the pressure pulse travels within the blade a pulse of air is forced out of slots 18. In order that the pulses of air exiting through slot 18 in blade 16 do so at the same azimuthal position as the pulses exiting through slot 18 in blade 14, it is obvious that the speed of rotor 10 must be coordinated with the speed of travel of the pulses of air within rotor blades 14 and 16. That is, rotor 10 must make one half of a revolution in the time that it takes a pressure pulse to travel the length of each rotor blade and return to the hub. As rotor 10 completes a revolution another pulse of air exits from tube 20. Since the two pulses are in phase with each other, there is no cancellation between pressure pulses; each pressure pulse reinforces the proceeding one until equilibrium is established within rotor 10. When equilibrium has been established, the pressure within the blades will rise to the same maximum with each pulse and will fall to the same minimum between pulses; it is anticipated that it should require not more than 10-15 cycles to reach this equilibrium condition.

Collective lift control air can be supplied to blades 14 and 16 through annulus 30 within main shaft 12. A constant supply of air is fed to blades 14 and 16 to produce equal lift at all points of the cycle. Pulses of air from tube 20 are then added to the collective lift control air flow to produce cyclic lift. Alternatively, all the air required for operation of the helicopter rotor can be supplied through tube 20. The air will be supplied in pulses, but the air exiting from slots 18 will not drop off to zero between pulses. As the pulses travel within blades 14 and 16 the pressure within the blades does not fall to zero between pulses; there is always a residual pressure within the blades that will cause a certain minimum amount of airflow through slots 18 at all times. This minimum airflow then becomes the collective lift control airflow and the additional air, which varies cyclicly, is the cyclic lift control airflow.

The column of air within rotor blades 14 and 16 vibrates preferentially at its resonant frequency, hence that is the frequency that is used as the basis in calculations. It has been found that a two bladed rotor of the FIG. 1 configuration having a diameter of 40 feet has a resonant frequency of 6.5 cycles per second. This is equivalent to a rotor speed of 390 revolutions per minute, which gives a tip speed of 816 feet per second; this is well below the speed of sound, hence is an acceptable speed.

Figure 2:
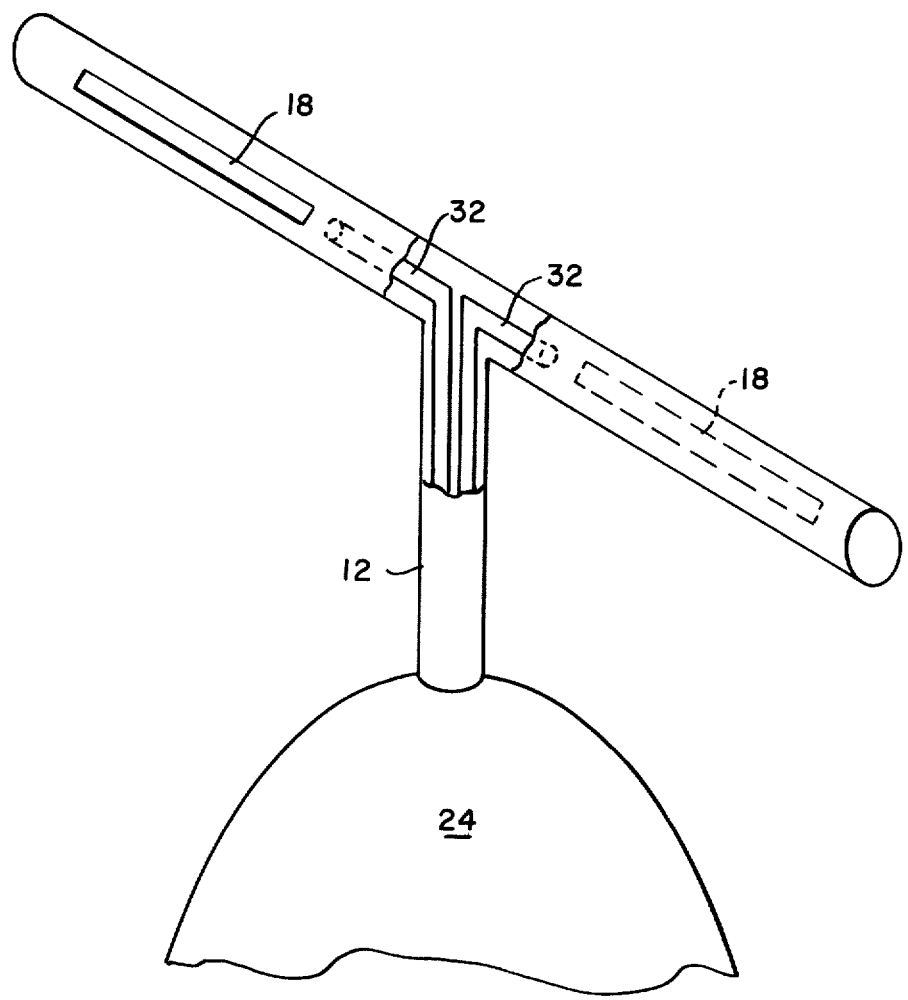
FIG. 2 shows a circulation control rotor according to the present invention having one pulse tube for each blade.

The configuration shown in FIG. 2 differs from that shown in FIG. 1 only in that the rotor is blocked at its center and each blade has its own pulse tube 32. Operation of a rotor such as this is the same as that of the configuration shown in FIG. 1 except that the effective diameter of the rotor, for purposes of calculating the resonant frequency of the air column, is now half of what is was in the configuration shown in FIG. 1. This means that a rotor having a pulse tube in each blade must rotate twice as fast as a rotor of the same diameter having only one pulse tube for each pair of blades. The configuration shown in FIG. 2 allows the use of any number of blades (i.e. 3, 4, 7, etc) whereas the configuration of FIG. 1 requires even numbers of blades (i.e. 2, 4, 6, etc) arranged in pairs. When multiple pair of blades are used in the configuration shown in FIG. 1 each pair of blades may be physically separated from the other pairs or, alternatively, all pairs may be joined at a common point on the shaft; in the latter instance, however, each pair of blades must have its own pulse tube 20.

The timing of the pulses can be accomplished by means of a cam attached to shaft 12 and associated with pulse generator 22; this cam will then trigger a pulse each time the rotor assumes a certain azimuthal position. Another method would be to have a pressure sensitive switch located in the end of one of the blades. After an initial pulse is sent through the rotor blades, the pressure sensitive switch would then trigger all succeeding pulses in their proper order. Since the resonance of the air column within the rotor blades is independent of rotor rotation, the air column in this configuration could be made to resonate with the rotor standing still.

The horizontal direction of flight of the helicopter is set by setting the azimuthal position of the cyclic air pulses. If the generator is controlled by a cam, the azimuthal position of the air pulses will be determined by the azimuthal position of the cam; therefore, merely moving the cam to a new azimuthal position will change the azimuthal position of the air pulses a similar amount and a change in flight path will be effected.

If the pulse generator is controlled by a pressure sensitive switch, there must be some means incorporated in the circuitry controlling the switch to both advance and retard the timing of succeeding pulses in order to control horizontal flight of the craft. Advancing the timing shifts the azimuthal position against the direction of rotation, while retarding the timing shifts the azimuthal position in the direction of rotation. By holding the timing of the pulse generator at a frequency either above or below the resonant frequency for a given length of time, the azimuthal position of the pulses of cyclic lift can be moved to any point on the rotor disc. This would also be accomplished by changing the speed of rotation of the rotor; increasing the speed slightly will shift the azimuthal position with the direction of rotation, decreasing the speed will shift the azimuthal position against the direction of rotation.

Air pulse tubes 29 and 32 can be made adjustable in length during flight in order to shape the pressure gradient within the blades. Varying the pressure gradient varies and enriches the harmonics of the column of air and sets their relative phases.

This allows the desired harmonic frequencies to be imposed on the primary frequency, thereby "tuning" the column of air to cancel out vibrations generated by the rotor. Varying the length or pressure of the pulses of air also shapes the pressure gradient, giving additional means of "tuning" the rotor.

Obviously many modifications and variations of the present invention are possible in light of the above teachings. It is therefore to be understood that within the scope of the appended claims the invention may be practiced otherwise than as specifically described.

What is claimed is:

1. In a circulation control rotor having hollow blades attached to a hub rotated by some external means, the method of producing cyclic lift which comprises:
matching the rotational speed of the rotor with the natural frequency of vibration of the fluid column in the blades; and
injecting pulses of fluid into the blades at a constant azimuthal position of the rotor.

* * * * *